June 16, 1964     W. F. CLEMENT ETAL     3,137,169
REMOTE INDICATING DEVICE
Filed Sept. 21, 1961     2 Sheets-Sheet 1
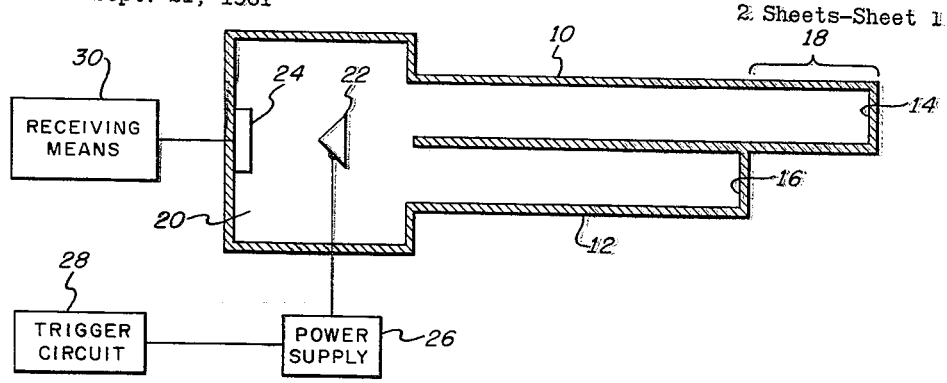
FIG.1.
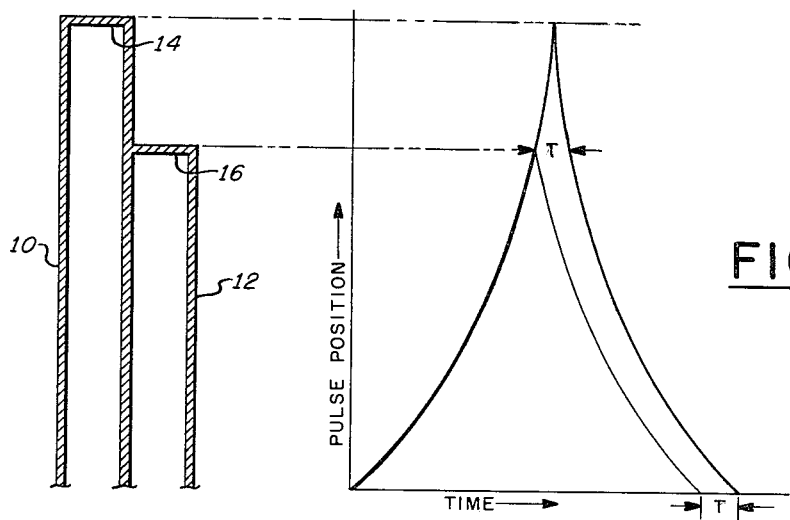
FIG.2.
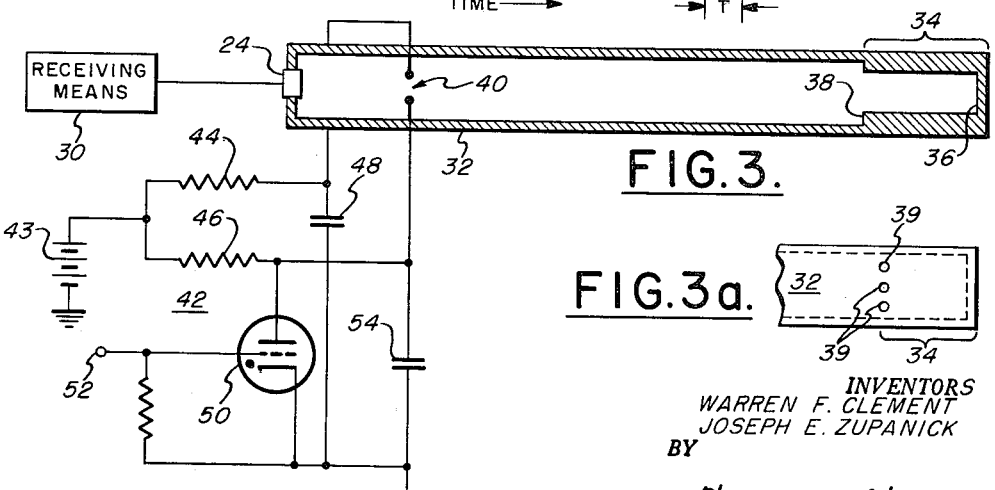
FIG.3.
FIG.3a.
INVENTORS
WARREN F. CLEMENT
JOSEPH E. ZUPANICK
BY
ATTORNEY

United States Patent Office 3,137,169
Patented June 16, 1964

3,137,169
REMOTE INDICATING DEVICE
Warren F. Clement, Glen Head, and Joseph E. Zupanick,
Westbury, N.Y., assignors to Sperry Rand Corporation,
Great Neck, N.Y., a corporation of Delaware
Filed Sept. 21, 1961, Ser. No. 139,720
14 Claims. (Cl. 73—339)

This invention relates to measuring devices and more particularly it concerns an instrument for the remote indication of the magnitude of a given condition.

Remote indicating systems generally involve the transmission of signals having a characteristic proportional to magnitude of the condition to be indicated. A remote receiving means ascertains the value of the particular characteristic of the received signals. The signals may originate from the region itself whose condition is to be measured, or they may be generated at another remote point and passed through the region. In the measurement of high temperatures, for example, two well known techniques include the use of optical pyrometers and variable electrical resistance devices. The optical pyrometers depend upon radiant signals which originate in the medium whose temperature is to be measured, while the variable resistance pyrometers utilize externally generated electrical currents.

Although optical devices are useful at extreme temperatures they are limited somewhat in accuracy. This is because output indications vary with the composition of the medium as well as its temperature. Also these devices are useful only under limited conditions i.e., where it is possible to directly sight the region to be measured.

Variable resistance devices, although operable under a wide variety of conditions, are generally limited in range inasmuch as known electrically conductive materials cannot withstand excessively high temperatures. Furthermore temperature variations between the resistance element and the observer will affect the over-all resistance of the circuit and thus degrade accuracy of the device.

A further limitation of known temperature measuring devices is the difficulty with which their outputs are adapted to digital type computing equipment.

Consequently it is an object of this invention to provide remote measuring equipment whose accuracy is not affected by variations in conditions between the sensing and the observing means.

It is another object of this invention to provide such a device which does not require a direct line of sight between the sensing and the observing means.

Another object is to provide a simple and accurate means for remote temperature measurement.

A further object is to provide a remote temperature measuring apparatus operable over a very wide range.

A still further object is to provide such a device which inherently produces output signals of a digital nature.

These and other objects of the invention are accomplished in the following manner. Signals are supplied to a sensing means according to a known relationship. The sensing means affects each signal in a discrete manner depending upon the magnitude of a condition to be measured. The signals emerging from the sensing means will bear a new relationship to each other which is a function of the magnitude of the condition. They are then passed through substantially identical transmission paths so as to preserve this relationship which is ascertained at a remote receiving means.

More specific forms of the invention utilize the principle that the velocity of propagation of a pressure disturbance in an elastic medium varies as a function of temperature. Thus temperature is measured at a remote point by simultaneously supplying acoustical pulses to different length sections of closely spaced gas filled tubes which are terminated in reflecting elements. The difference in length of time required for the pulses to traverse their respective sections and be reflected back depends upon the temperature of the tubes. The reflected pulses are then propagated through the same or identical acoustical transmission lines to a remote receiving means where their time displacement is detected.

In the figures:

FIG. 1 is an illustration, partially in schematic, showing one form of the invention;

FIG. 2 is a graphical representation useful in understanding the operation of the embodiment of FIG. 1;

FIG. 3 is an illustration showing a second embodiment of the invention;

FIG. 3a is an illustration showing an alternative form of a portion of the embodiment of FIG. 3;

Figure 4:
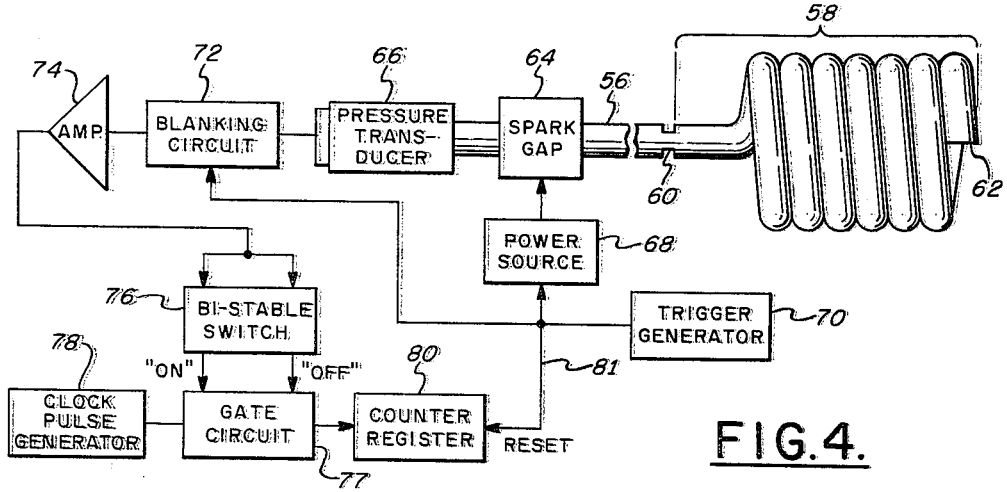
FIG. 4 is an illustration, partially in schematic, of a preferred embodiment of the invention.

Referring now to FIG. 1, a first embodiment of the invention is seen to include a pair of closely spaced acoustical transmission lines 10 and 12. These lines may be of any construction which will propagate acoustical disturbances with a minimum of attenuation and distortion. For most purposes these lines may comprise tubular metallic conduits containing a gaseous medium such as air. The lines are terminated at one end by means of reflecting elements 14 and 16. It should be noted that although the reflecting elements are shown in FIG. 1 as closed ends of the respective conduits, they may be any form of mechanical or thermal discontinuity in the boundaries or medium comprising the lines. Thus the tubes may merely be left open and the interruption of the metallic boundaries at the ends of the tubes will produce the desired acoustical reflections. The first line 10 has an extended sensing portion 18 which protrudes a certain distance beyond the reflecting element 16 of the second line 12. The other ends of the transmission lines are flush with each other and are connected to a common chamber 20. An acoustical pulse generator 22 and a pressure transducer 24 are located within the chamber 20. The pulse generator may be any device capable of generating a sudden pressure disturbance or shock. Thus an ordinary loud speaker, a powder cartridge, or an electrical arc generating means will suffice as the pulse generator. A power supply 26 is connected to the pulse generator 22 and supplies sufficient energy to produce a sharp powerful acoustical pulse within the chamber.

Operation of the power supply is initiated by means of a trigger circuit 28. The pressure transducer 24 converts reflected acoustical disturbances to electrical pulses. These pulses are supplied to a receiving means 30 where they are detected and their time relationship is noted. The time duration between reflected pulses as will be explained, is related to the temperature at the sensing portion 18.

Prior to operation of the device the extended sensing portion 18 is subjected to the environment whose temperature is to be measured. After the sensing portion has attained the temperature of the environment, the trigger circuit 28 is activated. This causes the power supply 26 to supply the pulse generator 22 with sufficient energy to generate a sudden pressure disturbance within the chamber 20. This produces a pair of acoustical pulses at the entrances to the transmission lines 10 and 12. The pulses propagate through the acoustical lines and follow a velocity pattern governed by the temperature variations along the lines.

It is to be noted that since the acoustical lines are closely spaced and substantially identical, their corresponding points are always at the same temperature. Because of this the pulses travel at identical velocities in the forward direction and remain at the same relative positions along the similar portions of the lines. When the pulse in the second line 12 reaches the reflecting surface 16 its direction of propagation is reversed back toward the chamber 20. Meanwhile the pulse in the first line 10 continues to propagate in the forward direction through the sensing portion 18 at a velocity dependent upon the temperature in this region. The pulse continues thus to propagate until it reaches the reflecting element 14 whereupon its direction is also reversed toward the chamber 20. Since each reflected pulse retraces its forward journey through the same respective transmission path it follows a velocity pattern which mirrors that of its forward travel. Thus in the reverse direction as well as in the forward direction the pulses undergo no relative displacement while both are in the similar portions of the lines; and the total relative displacement between the pulses occurs solely as a result of the traversal time of one of them through the extended sensing portion 18.

When the reflected pulse from the second transmission line 12 impinges upon the pressure transducer 24, an electrical signal is generated which initiates a timing period in the pulse receiving means 30. When the other reflected pulse from the first line 10 subsequently impinges upon the pressure transducer 24, a further electrical signal is generated which terminates the timing period. The timing period is seen to be related to the traversal time of the pulse from the first line 10 through the extended portion 18 and back again. This in turn represents the temperature at the extended sensing portion 18.

FIG. 2 shows in diagrammatical manner, the relative positions of each pulse in the transmission lines during their propagation through the lines. In this time-distance diagram the slope of the pulse position line at any point is proportional to the velocity of the pulse at that point. In a typical application the observing end of the device, represented by the chamber 20 and its associated components, would be at a much lower temperature than would be the sensing portion of the device represented by the extended portion 18. Between these points, temperature gradients of various unknown magnitudes exists. It can be seen in the plot of FIG. 2 that a relatively shallow slope or low velocity is represented during the times the pulses are closer to the observing end of the device whereas rather steep slopes represent the higher velocities of the pulses near the sensing end of the device. It is to be noted that although the transmission lines are subjected to various unknown temperatures between the sensing and observing portions, their corresponding regions are at the same temperatures and the pulses undergo identical velocity patterns represented in FIG. 2 by substantially parallel lines. Thus it is seen that no time displacement between the pulses is produced in the region between the observing portion and a distance defined by the first reflecting surface 16. The only time displacement between the pulses is produced by the traversal of the pulse in the first line 10 through the extended sensing portion 18. This time displacement is represented by the distance T in FIG. 2, and is seen to be dependent upon both the length of the extended portion 18 and the slope of the line representing pulse position in this region. Since the length of the extended portion is known and since changes in slope vary with pulse velocity which in turn change with temperature, the time displacement can be used to indicate the temperature in the sensing region. Also as stated previously no relative time displacement is produced on the pulses by any of the remaining portion of the lines. Thus the temperature indication represented by the time displacement at B is preserved (as shown by the parallel lines) back to the observing portion of the device.

Two distinct advantages can be seen by means of this diagram. First the temperature of the extended portion 18 may be accurately represented by a remote observing station irrespective of any temperature gradients or variations between these two points. Secondly, the temperature is represented as a function of the time displacement between two reflected pulses. Because of this, the system is readily adaptable to digital indication and/or computation systems. For example, the loading or unloading of a counter-register representing temperature may be started and stopped by the two reflected pulses.

An improved embodiment of the invention is shown in FIG. 3. In this embodiment a composite transmission line 32 replaces the individual transmission lines 10 and 12 shown in FIG. 1. The present embodiment has an extended sensing portion 34 which is defined by a pair of longitudinally displaced reflecting elements 36 and 38. The first reflecting element 38 may be any discontinuity which will also permit transmission of a portion of energy incident upon it. In the present embodiment this partial reflector is seen to be an internal step in the transmission line 32. A pulse from the opposite end of the line is partially reflected by the discontinuity 38 while the remainder of the pulse propagates on to the other reflecting surface 36.

This embodiment operates in a manner similar to that of the embodiment of FIG. 1, and as with FIG. 1, its operation may be analyzed according to the diagram of FIG. 2. The advantage of this device over that shown in FIG. 1 lies in the fact that the transmission lines between the observing and the sensing ends are assuredly identical and no possible displacement of the reflected pulses is attributed to variations in temperature along the lines. Furthermore this device is simpler and easier to use than the previous embodiment.

The acoustical pulse generating means shown in FIG. 3 comprises a spark gap 40 supplied by a driving circuit 42. In the driving circuit 42, a high voltage from a source 43 is supplied via a pair of resistors 44 and 46 to opposite ends of the spark gap 40. A storage capacitor 48 is connected between one of the ends of the spark gap and ground. The capacitor supplies the large current values needed during arcing of the gap. An electric switch 50, such as hydrogen thyratron, is connected between the other end of the spark gap and ground. Trigger pulses are supplied via an input terminal 52 to the grid of the thyratron 50. These pulses cause the tube to conduct heavily so as to rapidly lower the voltage at one of the terminals of the spark gap 40. When the voltage across the gap attains a sufficient magnitude an arc is initiated and continues until the charge across the storage capacitor 48 is depleted, whereupon the arc ceases and the storage capacitor again charges to its full capacity. A further capacitor 54 is shown in parallel with the thyratron 50. The purpose of this further capacitor is to prevent the full value of the voltage source 43 from being applied too suddenly to the thyratron after each discharge at the spark gap.

An alternate construction of the sensing portion 34 of the embodiment of FIG. 3 is shown in FIG. 3a. This alternate structure is basically the same as that of FIG. 3 and differs only in the specific form of the first reflecting element. In FIG. 3a the first reflecting element is shown as a series of holes 39 which penetrate completely through the wall of the transmission line 32 at the beginning of the sensing portion 34. This arrangement may be used in an environment where the pressure and medium in the region whose temperature is to be measured is such as can be employed as the acoustical propagation medium in the transmission line. This reflecting means is much easier to construct than that of FIG. 3. Also it has been found that energy losses through the holes of the device are so slight as to be insignificant.

A preferred embodiment of the invention is shown in FIG. 4. In this embodiment a composite acoustical transmission line 56 is connected to an elongated sensing portion 58 which is in the form of a tightly wound coil. A pair of acoustical reflecting elements 60 and 62 are provided in the line on either side of the coil 58. The first reflecting element 60 is arranged in a manner to permit a portion of incident acoustical energy to pass through to the coil 58 while the remainder of the incident energy is reflected back toward the source. In this respect the present embodiment operates as does that of FIG. 3. The purpose of the elongated sensing region is to obtain a greater time period between the reflected signals.

It is well known that in acoustical transmission systems the higher frequency components of propagating signals suffer greater attenuation than do the lower frequency components. Thus an initially sharply defined square shaped pulse of acoustical energy will degenerate toward the general shape of a sine wave upon passing through the transmission line 56. As a result, the time of occurrence of a reflected pulse is difficult to ascertain with high accuracy. However if, as in the present embodiment, the time between reflected pulses is increased, the effect of this pulse rounding on over-all accuracy is reduced.

The turns of the coil 58 are tightly wound upon each other to provide good thermal continuity. This promotes a uniform temperature distribution within the sensing region. By maintaining the entire sensing region at a uniform average temperature, a more accurate indication is obtained. This occurs from the fact that acoustical propagation velocities in most media vary in a non-linear manner with temperature. Thus the indication obtained by a pulse which traverses a sensing region in which there is a temperature gradient will not be the same as that obtained by a pulse traversing a sensing region which is maintained at a uniform average temperature. The tightly wound coil also permits an elongated sensing region to be used in a more compact unit.

An acoustical generator in the form of a spark gap 64, and a pressure transducer 66 are provided at the opposite end of the transmission line 56. These elements operate in a manner similar to their counterparts in the previous embodiments. The spark gap 64 is supplied from a power source 68 which in turn is activated by means of a trigger generator 70. The pressure transducer 66 converts acoustical pulses to electrical signals which are supplied to the various elements which make up the indicating portion of the device. A blanking circuit 72 is provided at the output of the pressure transducer 66 in order to block signals during the firing of the pulse generator 64. The blanking circuit is activated by the trigger generator 70. The acoustical pulses however, which are reflected from the sensing end of the device, arrive at the pressure transducer 66 at a finite time subsequent to the initial trigger pulse; and the electrical signals thus generated are passed through the blanking circuit 72. These signals are also passed through an amplifying circuit 74 and then applied to a bistable switching means 76. The bistable switching means may be any element capable of alternately switching a device on and off in response to successive input signals. Such a switching device may be, for example, a bistable multivibrator. The two output terminals of the multivibrator 76 are connected respectively to the "on" and "off" terminals of a gate circuit 77. The gate circuit 77 controls the passage of pulse signals from a clock pulse generator 78 to a counter register 80. The clock pulse generator 78 operates continuously, producing a rapid succession of accurately spaced impulses. The counter register, however records only those impulses produced during the time the gate circuit 77 is in its "on" or open condition. A reset line 81 is provided between the trigger generator 70 and the reset terminal of the counter register 80. This ensures that the counter register is cleared or is in its zero condition at the beginning of each measurement.

During operation of the device the trigger generator 70 supplies a pulse to the power supply 68 and to the blanking circuit 72. This causes an acoustical signal to be produced at the pulse generator 64. The pulse travels toward the pressure sensing region of the device. However, since the blanking gate 72 is activated during this time, no electrical signals are passed from the transducer 66. Meanwhile the acoustical pulse in the transmission line 56 propagates in the forward direction until a portion of it is reflected at the first reflecting element 60. The reflected portion travels back toward the pressure transducer 66 while the remainder of the pulse continues to propagate through the coil 58 to the second reflecting element 62. This remaining portion of the original pulse is then reflected back through the coil and the line to the pressure transducer 66; arriving at a time subsequent to the arrival time of the first reflected portion of the pulse.

As in the previous embodiments the time delay between the two reflected pulses is dependent upon the length and the temperature of the sensing portion of the device. The first reflected pulse causes the bistable switch 76 to turn on the gate circuit 77 which in turn allows a rapid succession of accurately spaced impulses from the clock pulse generator 78, to pass to the counter register 80. These impulses continue until the second reflected pulse causes the bistable multivibrator to turn off the gate circuit 77. The duration of time between the reflected acoustical pulses is seen to be indicated on the counter 80. The counter may be calibrated to a direct indication of temperature or its output may be applied to a computing device.

As stated previously, a longer sensing portion will improve the accuracy of the device by increasing the time period between reflected pulses. An alternate method for increasing this time period is to decrease the acoustical velocity through the sensing region. This may be accomplished by choosing a medium in the extended portion of the device which has a very low propagation constant. It is known that gases of high molecular weights have the lowest acoustical propagation constants.

Figure 5:
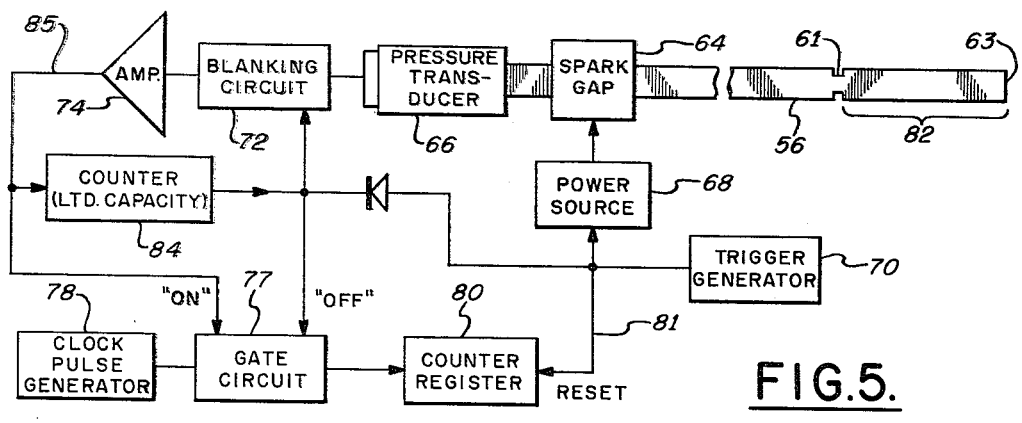
FIG. 5 is another illustration also partially in schematic showing a modification of the embodiment of FIG. 4; and, FIG. 6 is a second graphical representation useful in understanding the operation of the embodiment of FIG. 5.

The embodiment shown in FIG. 5, employs a somewhat different means for reducing the effects on accuracy caused by degeneration of the acoustical pulses. In this embodiment an acoustical pulse is made to traverse the sensing portion a known number of times thus increasing the total length of time for which its velocity is measured. The general structure of this embodiment is similar to that of FIG. 4. Although the sensing region of the device is shown as a relatively short extended portion 82, it may assume the form of any of the sensing portions described in preceding embodiments. The essential restriction upon this extended portion is that the first reflecting element 61 be bi-directional. That is, this element must be capable of permitting a portion of incident energy to propagate past the element irrespective of whether the incident energy approaches from the direction of the pulse source or from the second reflecting element 63. It is to be noted that all of the first reflecting elements previously described are bi-directional. Thus the first reflecting element 61 may be any discontinuity in the transmission line such as a hole, slot, obstruction, annular depression or annular elevation.

A pulse generating means and an indicating means are provided at the opposite end of the transmission line 56. The pulse generating means is shown to comprise the same components as in the preceding embodiment. The indicating means also is generally similar to that previously described. In the present device, however, a second counter 84 having a preselected counting capacity replaces the bistable switch means 76 of FIG. 4. The overflow from this second counter is applied to the "off" terminal of the gate circuit 77. A lead 85 directly connects the output of the amplifying circuit 74 to the "on" terminal of the gate circuit.

The general operation of this device is similar to that of the preceding embodiments. An acoustical pulse produced at the pulse generating means 64 propagates through the transmission line 56 to the sensing region 82. A portion of the pulse is reflected at the first reflecting element 61 while the remainder continues to propagate through the sensing region until it is reflected at the second reflecting element 63. However when this portion of the pulse again becomes incident upon the reflecting element 61, only part of it is returned to the observing end of the device while the remainder is reflected back toward the second reflecting element 63. The pulse continues to reciprocate between the two reflecting elements 61 and 63, while each time it becomes incident upon the first reflecting element 61 a portion of it is transmitted back to the pulse transducer 66.

The first reflected portion of the initial pulse becomes incident upon the pulse transducer 66 and causes an electrical signal to be transmitted directly via the lead 85 to gate on the clock pulse generator 78. The clock pulse generator continues to supply impulses to the counter register 80 until a signal from the second counter 84 is applied to the "off" terminal of the gate circuit 77. The output of the clock pulse generator is registered in the first counter 80 in a manner similar to the preceding embodiment.

The subsequently reflected portions of the initial acoustical pulse are also converted to electrical signals which are applied to the second counter 84, each pulse causing the counter to more nearly attain its ultimate capacity. The next pulse following after the second counter 84 becomes filled and causes the counter to overflow. This produces a signal at the "off" terminal of the gate circuit 77 which in turn interrupts the flow of signals from the clock pulse generator 78. The total count registered in the first counter 80 is then a measure of the time required for an acoustical pulse to traverse the sensing region 80 a number of times equal to the capacity of the second counter 84. For purposes of measuring the velocity of the pulse, which is also a measure of temperature, it is seen that the sensing portion has been effectively lengthened by a number of times equal to this capacity. Thus in ascertaining the length of the timing period, the effect of errors which results from the rounded edges of the reflected pulses are diminished proportionately.

Figure 6:
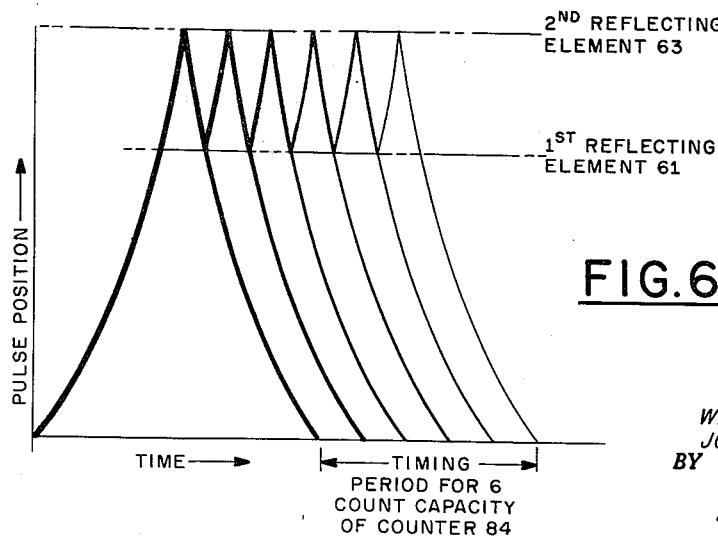

The operation of the embodiment of FIG. 5 can be analyzed more thoroughly by reference to the diagram of FIG. 6. This diagram is similar to that of FIG. 2 and shows the position of the various portions of the pulse in the transmission line and in the sensing region at different times. In this diagram the width of the pulse position line is proportional to the amount of energy contained in the portion of the pulse at any position. It can be seen that as the pulse reciprocates within the extended portion 82, its energy is gradually depleted as portions of the pulse are transmitted back to the receiving end of the device. Also since these transmitted portions represent fixed percentages of the total energy in the sensing region as of the time they are generated, they also steadily diminish in amplitude. The effect of this on accuracy, however, becomes negligible since in the present arrangement it is necessary only to know whether or not a pulse has occurred within a given time interval and not precisely when it occurred or what its amplitude is. It should further be noted that it is only the rounding of the last reflected portion of the original pulse which has any effect on accuracy; and this effect is diminished proportionately as the total number of reciprocations in the sensing region is increased.

The primary advantage of this last embodiment lies in the fact that a high degree of accuracy may be obtained with a shorter and more compact sensing portion. Thus the temperature at a specific point may be measured and the possibility of gradients in the sensing region is reduced.

While the invention has been described in its preferred embodiments, it is to be understood that the words which have been used are words of description rather than limitation and changes within the purview of the appended claims may be made without departing from the true scope and spirit of the invention in its broader aspects.

What is claimed is:

1. A device for remotely indicating the magnitude of a given condition, said device comprising pulse signal generating means capable of providing a pair of acoustic pulse signals having a known relationship, signal modifying means capable of changing said known relationship in accordance with the magnitude of said condition, signal conveying means for propagating each of said acoustic pulse signals over substantially identical paths to a remote signal receiving means and means associated with said receiving means for ascertaining the time displacement between received pulses.

2. A remote condition measuring apparatus comprising a signal transmitting element having a signal modification characteristic which varies according to a known relationship with the magnitude of said condition, a signal receiving means, a pair of closely spaced substantially identical signal transmission paths each having one end connected to said receiving means, the remaining end of one of said transmission paths being connected to the output of said signal transmitting element, means for applying acoustic pulse signals to the input of said signal transmitting element and to the remaining end of the other of said transmission paths according to a known relationship, an acoustic reflecting termination in said transmitting element to reverse the direction of propagation of the acoustic pulses therein, and means associated with said receiving means for ascertaining the relationship between the signals received along each of said transmission paths.

3. A remote condition measuring apparatus comprising a wave signal transmitting element having a velocity modification characteristic which varies according to a known relationship with the magnitudes of said condition, a signal receiving means, a pair of closely spaced substantially identical wave signal transmission paths each having one end connected to said receiving means, the remaining end of one of said transmission paths being connected to the output of said signal transmitting element, means for applying acoustic pulse signals to the input of said wave signal transmitting element and to the remaining end of the other of said transmission paths in a known time relationship, an acoustic reflecting termination in said transmitting element to reverse the direction of propagation of the acoustic pulses therein, and means associated with said receiving means for ascertaining the time interval between pulse signals received along each of said transmission paths.

4. The device as described in claim 3 wherein said condition to be measured is temperature, and said wave signal transmitting element comprises a length of an elastic medium having a pressure-density ratio which varies with temperature.

5. A remote condition measuring apparatus comprising a pair of closely spaced wave propagating elements, each terminated at one end by a wave reflector the remaining ends of said elements being substantially flush, at least one of said elements including a length of a medium having a wave signal phase modification characteristic which varies with the magnitude of said condition, each of said elements being characterized by a distinct combination of length and wave propagating medium, a pair of substantially identical closely spaced wave transmission paths connected respectively to said remaining ends of said wave propagating elements, means for introducing wave signals into each of said transmission paths in a known phase relationship and means for ascertaining the phase relationship between reflected wave signals propagating through each of said transmission paths.

6. A temperature measuring device comprising a pair of acoustical transmission lines, one of said lines having an extended portion at one end, said extended portion protruding beyond the corresponding end of the other of said lines, said extended portion containing an elastic medium having a pressure-density ratio which varies with temperature, said lines being terminated at said one end and said corresponding end respectively by acoustical reflecting surfaces, said lines being substantially identical in all other respects, means for generating acoustical signals at the other ends of said lines in a known time relationship and means for ascertaining the time relationship between reflected signals received at said other ends.

7. A temperature measuring device comprising an acoustical transmission line, a pair of acoustical reflectors longitudinally displaced within said line, at least one of said reflectors being arranged in a manner to permit transmission of a portion of incident acoustical energy, said transmission line between said reflectors having temperature sensitive acoustical propagation characteristics, means for initiating an acoustical signal in said line at a point closer to said one reflector, means for detecting reflected acoustical pulses at a second point in said line, said second point also being closer to said one reflector and means associated with said detecting means for ascertaining the time between reflected signals.

8. The device as in claim 7 wherein said transmission line in the vicinity of said one reflecting element includes a length of an acoustically permeable medium bounded by a smooth surface parallel to the longitudinal axis of said line, said one reflecting element comprising a discontinuity in said surface.

9. The device as in claim 8 wherein said transmission line in the vicinity of said one reflecting element includes a solid tubular member enclosing a fluid medium, said one reflecting element comprising a discontinuity in the inner surface of said tubular member.

10. The device as in claim 9 wherein said discontinuity is an annular protrusion within said tubular member.

11. The device as in claim 9 wherein said discontinuity comprises an aperture which penetrates through a wall of said tubular member.

12. A remote temperature measuring apparatus comprising a coil of acoustical transmission line having a temperature sensitive acoustical propagation characteristic, a pair of acoustical reflecting elements at either end of said coil, at least one of said reflecting elements being arranged to permit a portion of incident acoustical energy from within said coil to pass into said coil and to permit energy from within said coil to pass out of said coil, an acoustical generator and an acoustical sensing means remote from said coil, a length of acoustical transmission line connecting the end of said coil containing said one reflecting element to said acoustical generator and to said acoustical sensing means, and means associated with said acoustical sensing means for ascertaining the time displacement between signals from each of said reflecting elements.

13. The device as described in claim 12 wherein the turns of said coil are maintained in physical contact with one another.

14. A device for producing a digital representation of temperature at a remote point, said device comprising an acoustical transmission line having a longitudinal section characterized by a temperature sensitive acoustical propagation characteristic, a pair of acoustical reflecting elements longitudinally displaced within said line and enclosing said section, at least one of said elements being capable of reflecting and transmitting discrete portions of incident acoustical energy, means for generating an acoustical pulse within said line at a first point remote from said section closer to said one reflecting element, a clock pulse generator, means responsive to reflected acoustical pulses at a second point in said transmission line also closer to said one reflecting element to establish a time interval between pulses from each reflecting element, and means for registering the output pulses from said clock pulse generator during said time interval.

References Cited in the file of this patent

UNITED STATES PATENTS 2,934,756    Kalmus _____ Apr. 26, 1960

FOREIGN PATENTS 727,891    Great Britain _____ Apr. 13, 1955